Aug. 9, 1960     M. HINTERMANN ET AL     2,948,018
APPARATUS FOR THE PRODUCTION OF DENTAL PLATES
AND THE LIKE FROM PLASTIC MATERIAL
Filed Aug. 8, 1957                          2 Sheets-Sheet 1
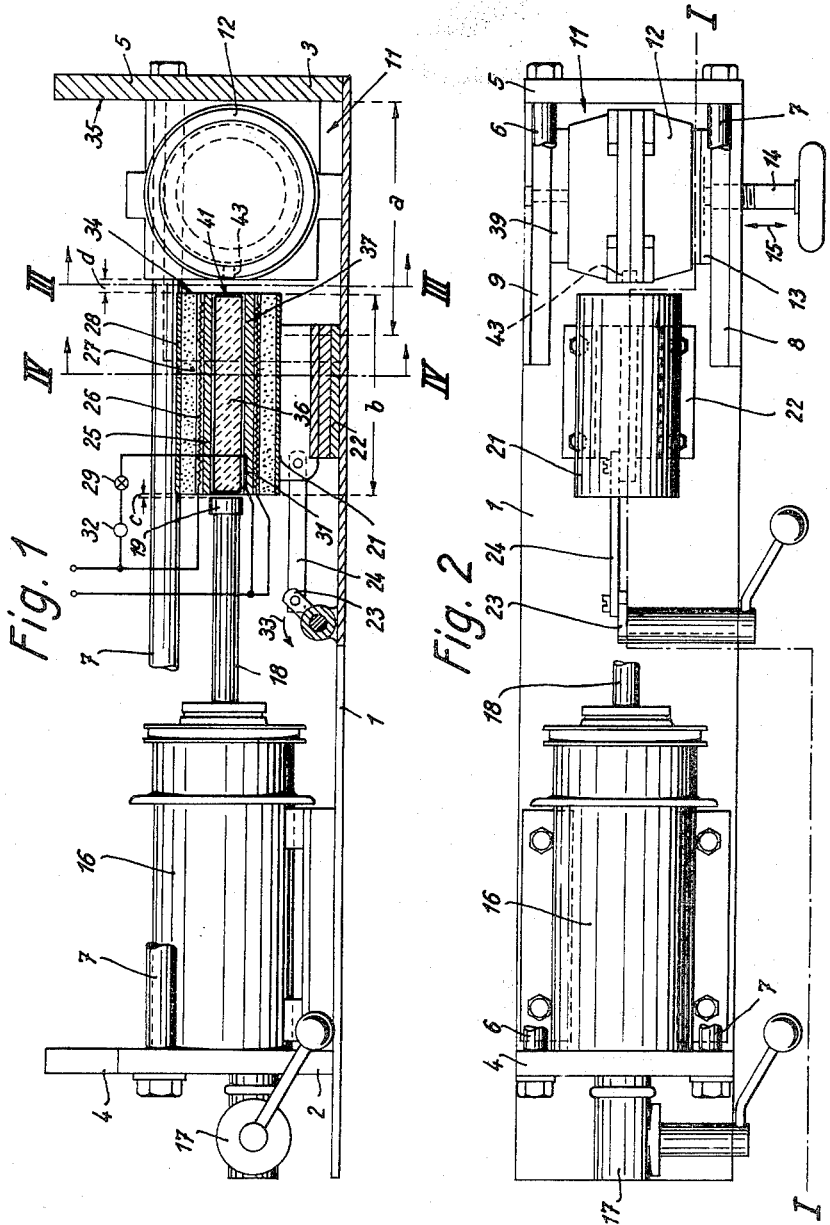
Inventors
Marcel Hintermann
and Philipp Ostermann
by: Michael S. Striker
    Attorney Aug. 9, 1960

M. HINTERMANN ET AL 2,948,018

APPARATUS FOR THE PRODUCTION OF DENTAL PLATES
AND THE LIKE FROM PLASTIC MATERIAL

Filed Aug. 8, 1957

Inventors
Marcel Hintermann
and Philipp Ostermann
by Michael S. Striker
Attorney

United States Patent Office 2,948,018
Patented Aug. 9, 1960

2,948,018

APPARATUS FOR THE PRODUCTION OF DENTAL PLATES AND THE LIKE FROM PLASTIC MATERIAL

Marcel Hintermann, Emmendingen, and Philipp Ostermann, Kehl (Rhine), Germany; said Ostermann assignor to said Hintermann Filed Aug. 8, 1957, Ser. No. 677,120

Claims priority, application Germany Aug. 13, 1956

7 Claims. (Cl. 18—5.7)

This invention relates to an apparatus for the production of dental plates and other articles from plastic material in a casting mold, and which is provided with a heating arrangement for the plastic material to be introduced into the mold.

The object of the invention is to generally improve the known apparatus of this type so as to avoid residues of plastic material remaining adhering to the apparatus, to ensure an economical consumption of plastic material, to render it possible to introduce the plastic material into the mold in good flowing state to avoid as far as possible loss of heat, to make the service of the apparatus as easy as possible, and to obtain nevertheless a simplified construction of the apparatus itself.

This is attained according to the invention by providing an apparatus for producing dental plates and the like from plastic material in a casting mold, which comprises a pressure device with a free extrusion piston, a heating arrangement coordinated to said pressure device and adapted to receive the plastic material to be cast in a removable closed container which bursts open under the pressure exerted by the piston of the pressure device during the pressing operation, said heating arrangement, when operative, being in a position free from heat-conducting connection either with said piston or said casting mold.

The heating arrangement may be internally constructed as a sleeve for accommodating the container filled with plastic material. The outer wall of the sleeve is surrounded by heating means enclosed in an insulating body and is left open at its front and rear ends. The said heating arrangement is preferably shiftable particularly in horizontal direction, and moreover the internal diameter of the sleeve is made of the same size as the outer diameter of the container of the plastic material to be heated, which is introduced in closed state into the sleeve.

By this means the interior of the said sleeve no longer comes into contact at all with the plastic material which has been rendered viscous by the heating and consequently does not require to be specially cleaned every time after the production of the dental plates turned out one at a time. In addition such a container always contains just as much plastic material as is actually required for the production of a dental plate. Finally, by using such a container, special sealing elements which may get clogged, are no longer necessary on the side of the heating arrangement facing the mold.

So as to avoid any disadvantageous conducting off of heat by the extrusion piston of the pressure device during the pressing operation, this piston can preferably be made of a synthetic material which is a bad conductor of heat.

A preferred embodiment of the invention will now be described by way of example and with reference to the accompanying drawings, in which like characters of reference designate like parts throughout the several views thereof.

In the drawings:

Fig. 1 is a side elevational view, partly in section, of an apparatus with heating arrangement and casting mold according to the invention, in which said heating arrangement is illustrated in the position suitable for heating the plastic material;

Fig. 2 is a top plan view of the apparatus shown in Fig. 1;

Figure 3:
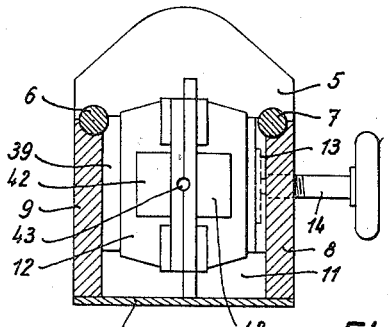
Fig. 3 is a section taken on line III—III of Fig. 1.
Figure 4:
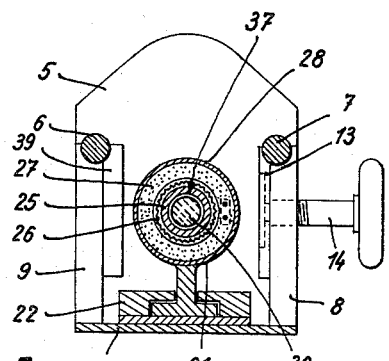
Fig. 4 is a section taken on line IV—IV of Fig. 1.

The apparatus illustrated in Fig. 1 comprises a bottom plate 1 and two vertical end plates 2 and 3 arranged at the ends of the bottom plate 1 and having upper parts 4 and 5 connected by tie rods 6 and 7 in such a manner that the bottom plate 1, the end plates 2 and 3 and the tie rods 6 and 7 constitute a rigid frame.

As can be seen from Fig. 2, a front plate 8 and a rear plate 9 are arranged in direct vicinity to the end plate 3 at the front and rear sides of the apparatus and these plates 8 and 9 form with the end plate 3 a box 11 for accommodating a casting mold or cuvette 12. For holding and compressing the cuvette 12 a pressure plate 13 is provided which is shiftable in the directions of the two-headed arrow 15 by means of a spindle 14 guided in the front plate 8.

At the end of the apparatus facing the end plate 2 a hydraulic or pneumatic pressure device 16 is arranged to which a pressure medium is fed through a three-way cock 17 situated outside the end plate 2. A piston rod 18 of the working piston (not shown) of the pressure device 16 projects at the end remote from the end plate 2 and has a free end constructed as an extrusion piston 19.

A heating arrangement 21 is provided between the pressure device 16 and the box 11 and is mounted on a rail 22 and shiftable in the longitudinal direction of the apparatus by means of a swing lever 23 and a connecting rod 24. The swing lever 23 or the connecting rod 24 preferably cooperates with a locking arrangement, not shown in the drawings, which facilitates the finding of a desired position when shifting the heating arrangement 21.

The heating arrangement 21 comprises a sleeve 25 having an outer wall which is surrounded by an electric heating means 26 around which a jacket of insulating material 27 and finally an outer jacket 28 are wrapped.

A control lamp 29 is connected in parallel with the electric heating means 26 and controlled by a heat-sensitive switch 31 influenced by the heating means 26. This control lamp 29 draws attention to the fact that the heating arrangement 21 has reached its necessary temperature. In the circuit of the control lamp 29 a time-adjustable indicating device in the form of an electric control clock 32 can be connected up which gives an acoustic signal when the time necessary for heating the plastic material has expired.

The apparatus operates in the following manner:

The heating arrangement 21 is first brought into the position illustrated in Fig. 1 by swinging the lever 23 in the direction of arrow 33, when the distance $a$ between the end face 34 of the heating arrangement 21 facing the end plate 3 and the surface 35 of the end plate 3 is at least as great as the length $b$ of the sleeve-like heating arrangement 21. In this position a removable closed container or cartridge 36 filled with plastic material and of a length equal to $b$ is slipped into the sleeve 25 from the right in Figs. 1 and 2. The cartridge 36 thereby fills the entire inner space 37 of the sleeve 25. When the cartridge 36 has been inserted, the cuvette 12 is introduced into the box 11 from above and pressed by means of the spindle 14 and the pressure plate 13 against an abutment surface 39 on the rear plate 9 (see Fig. 3).

The heating arrangement 21 is brought into the position shown in Fig. 1 by the lever 23 so that it is connected with the whole apparatus merely by the rail 22, the lever 23 and the connecting rod 24. Between the heating arrangement 21 and the piston 19 on the one hand and between the end face 34 and the cuvette 12 on the other hand there are spaces $c$ and $d$, respectively, which prevent the carrying off of the heat produced by the electric heating means 26.

The cartridge 36 is, however, only introduced when the sleeve 25 has attained a desired temperature at which the switch 31 reacts and thus closes the circuit of the lamp 29 which then gives a signal by lighting up. The control clock 32 is set in operation by the introduction of the cartridge. After being set for a sufficient heating period of, for example 15 minutes, it gives an acoustic signal which shows that the plastic material in the cartridge is sufficiently hot and ready for casting.

Figure 5:
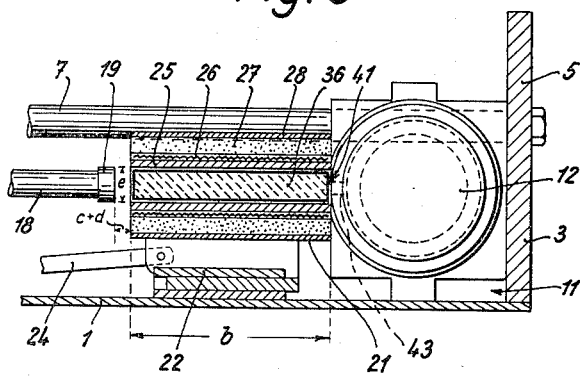
Fig. 5 shows the heating arrangement in its position shifted towards the mold before the extrusion of the plastic material.

For this purpose the heating arrangement 21 is shifted by further swinging the lever 23 in counter direction to the arrow 33, so far towards the cuvette 12 clamped in the box 11 that the end face 34 of the heating arrangement 21 bears against an abutment surface 42 provided on the cuvette 12. The three-way cock 17 is then opened so that the pressure medium, for example compressed air having a pressure of about 6 to 15 atm., flows into the pressure device 16 and pushes the piston rod 18 with its free extrusion piston 19 into the sleeve 25. The pressure of the piston 19 acting on the cartridge 36 causes said cartridge to burst open at its end face 41 bearing against an injection aperture 43 in the cuvette 12 and during the subsequent compression of the cartridge 36 the plastic material contained therein is pressed through said injection aperture 43 into the interior of the cuvette 12 in the manner illustrated particularly in Figs. 5 and 6.

Figure 6:
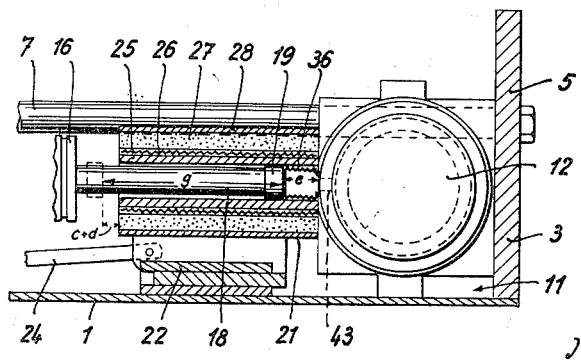
Fig. 6 is a view similar to Fig. 5 after the plastic material has been extruded.

Fig. 6 also shows that as the plastic material is extruded, the cartridge 36 is compressed from its original length $b$ to a length $e$ approximately corresponding to its diameter.

At the conclusion of the pressing operation the three-way cock 17 is closed so that the compressed air in the pressure device 16 escapes into the atmosphere and the working piston of said pressure device together with its piston rod 18 and the extrusion piston 19 arranged thereon can return into its initial position. Thereupon the heating arrangement 21 is pushed back into the position shown in dotted lines in Fig. 1 by swinging the lever 23 in the direction of the arrow 33, with the result that the cuvette 12 is liberated so that it can be taken out of the box 11 after the pressure plate 13 has been loosened by means of the spindle 14.

If the cartridge 36 compressed in the sleeve 25 is to be removed, this can be effected by again actuating the pressure device 16, the piston 19 of which ejects the remains of the cartridge 36 from the sleeve 25.

The cartridge 36 may be provided in the middle of its front face which bears against the cuvette 12 during the casting operation, with a thin membrane adapted in size to the injection aperture 43. Such membrane bursts more easily when pressing the cartridge for injecting the plastic material into the cuvette 12. The rear end face of the cartridge 36 and also its edge are preferably made somewhat stronger than its cylindrical wall. This prevents the cartridge 36 from bursting at its rear end while it is being compressed.

From the above detailed description of the invention, it is believed that the construction will at once be apparent, and while there is herein shown and described a preferred embodiment of the invention, it is nevertheless to be understood that minor changes may be made therein without departing from the spirit and scope of the invention as claimed.

We claim:

1. In an apparatus for injecting heat plasticizable material into a mold structure, the combination which comprises, entrance orifice means constituting part of said mold structure for the introduction of said material into said mold structure; supply conduit means for said plasticized material having a delivery end associated with said orifice means; a supply cartridge adapted to be placed in said conduit means comprising a casing containing said material, having a rupturable end portion; mounting means for placing said conduit means together with said cartridge placed therein in cooperative relationship with said entrance orifice means so arranged that said rupturable wall portion of the cartridge casing is placed directly in contact with said orifice means so that upon rupture of said wall portion the interior of said cartridge casing communicates through said orifice means directly with the interior of the mold providing for transfer of the material from the cartridge directly into said mold without contacting any part of the delivery end of said supply conduit means; and pressure means cooperatively associated with said supply conduit means operable to exert pressure upon the material in said cartridge casing effective to rupture said end wall portion thereof so that the material is displaced from the casing through the rupture directly into said mold.

2. In an apparatus for injecting heat plasticizable material into a mold structure, the combination which comprises entrance orifice means constituting part of said mold structure for the introduction of said material into said mold and having an orifice with an abutment face surrounding said orifice; supply conduit means for said plasticized material having a delivery end associated with said orifice means; a supply cartridge comprising a casing containing said material, having a rupturable end portion; mounting means for placing said conduit means together with said cartridge placed therein in cooperative relationship with said entrance orifice means so arranged that said delivery end of the conduit means has sealing engagement with said abutment face around the orifice and said rupturable wall portion of the cartridge casing is placed directly in contact with said orifice means so that upon rupture of said wall portion the interior of said cartridge casing communicates through said orifice means directly with the interior of the mold providing for transfer of the material from the cartridge directly into said mold without contacting any part of the delivery end of said supply conduit means; and pressure means cooperatively associated with said supply conduit means operable to exert pressure upon the material in said cartridge casing effective to rupture said end wall portion thereof so that the material is displaced from the casing through the rupture directly into said mold.

3. In an apparatus for injection molding of articles from heat plasticizable material, the combination which comprises, a base structure; a mold structure having an entrance orifice for the introduction of said material into said mold and having an abutment face surrounding said orifice; means for removably mounting said mold structure on said base structure; a tubular conduit member for said plasticized material having a delivery end associated with said orifice means; a supply cartridge adapted to be placed in said conduit member comprising a casing containing said material, having a rupturable end portion; mounting means for placing said conduit member together with said cartridge placed therein in cooperative relationship with said entrance orifice so arranged that said rupturable wall portion of the cartridge casing is placed directly in contact with said orifice so that upon rupture of said wall portion the interior of said cartridge casing communicates through said orifice directly with the interior of the mold providing for transfer of the material from the cartridge directly into said mold structure without contacting any part of the delivery end of said supply conduit member; and pressure means cooperatively associated with said conduit member operable to exert pressure upon the material in said cartridge casing effective to rupture said end wall portion thereof so that the material is displaced from the casing through the rupture directly into said mold, and also operable to expel the spent cartridge from said delivery end of the conduit member subsequent to the dismounting of said mold structure from said base structure.

4. In an apparatus for injection molding of articles from heat plasticizable material, the combination which comprises, a base structure; a mold structure removably mounted on said base structure and having an entrance orifice for the introduction of said material into said mold structure and having an abutment face surrounding said orifice; a tubular supply conduit member for said plasticized material having a delivery end associated with said orifice of the mold structure; a supply cartridge adapted to be placed in said conduit member comprising a casing containing said material, having a rupturable end portion; pressure means cooperatively associated with said conduit member operable to exert pressure upon the material in said cartridge casing effective to rupture said end wall portion thereof so that the material is displaced from the casing; and mounting means on said base structure operable to move said conduit member from an inoperative position spaced from said orifice into an operative position wherein said delivery end of the conduit member engages said abutment face of the mold structure in sealing relationship therewith and said rupturable wall portion of the cartridge casing is placed directly in contact with said orifice so that upon rupture of said wall portion the interior of said cartridge casing communicates through said orifice directly with the interior of the mold structure providing for transfer of the material from the cartridge directly into said mold structure by said pressure means without contacting any part of the delivery end of said conduit member, said mounting means being operable to move said conduit member to an inoperative position backed away from said abutment face of the mold structure allowing said mold structure to be dismounted from the base structure and the spent cartridge casing to be expelled from the delivery end of said conduit member.

5. In an apparatus for injection molding of articles from heat plasticizable material, the combination which comprises, a longitudinal base structure substantially defining a horizontal plane; a mold structure having an entrance orifice for the introduction of said material into said mold structure and having an abutment face surrounding said orifice, said mold structure comprising a pair of complementary shell portions with their meeting faces disposed in a plane bi-secting said orifice; clamping means provided on said base structure so arranged and operable as to compress said shell portions relative to each other so as to be fixed to said base structure and with said bi-secting plane extending substantially normal to and longitudinally of said horizontal plane of the base structure, and operable to release said mold structure; a tubular supply conduit member for said plasticized material having a delivery end associated with said orifice means; a supply cartridge adapted to be placed in said conduit member comprising a casing containing said material, having a rupturable end portion; pressure means cooperatively associated with said conduit means operable to exert pressure upon the material in said cartridge casing effective to rupture said end wall portion thereof so that the material is displaced from the casing; and mounting means on said base structure operable to move said conduit member from an inoperative position spaced from said orifice into an operative position wherein said delivery end of the conduit member engages said abutment face on the mold structure in sealing relationship therewith and said rupturable wall portion of the cartridge casing is placed directly in contact with said orifice so that upon rupture of said wall portion the interior of said cartridge casing communicates through said orifice directly with the interior of the mold providing for transfer of the material from the cartridge directly into structure by said pressure means without contacting any part of the delivery and of said supply conduit members, said mounting means being operable to move said conduit member to an inoperative position backed away from said abutment face of the mold structure allowing said mold structure to be dismounted from the base structure and the spent cartridge casing to be expelled from the delivery end of said conduit member.

6. In an apparatus for injection molding of articles from heat plasticizable material, the combination which comprises, a base structure; a mold structure having an entrance orifice for the introduction of said material into said mold structure and having an abutment face surrounding said orifice, said mold structure comprising a pair of complementary shell portions with their meeting faces disposed in a plane bisecting said orifice; means for removably mounting said mold structure on said base structure; a tubular supply conduit member for said plasticized material having a delivery end associated with said orifice; a supply cartridge adapted to be placed in said conduit member comprising a casing containing said material, having a rupturable end portion; pressure means cooperatively associated with said conduit means operable to exert pressure upon the material in said cartridge casing effective to rupture said end wall portion thereof so that the material is displaced from the casing; and mounting means on said base structure operable to move said conduit member from an inoperative position spaced from said orifice into an operative position wherein said delivery end of the conduit member engages said abutment face on the mold structure in sealing relationship therewith and said rupturable wall portion of the cartridge casing is placed directly in contact with said orifice so that upon rupture of said wall portion the interior of said cartridge casing communicates through said orifice directly with the interior of the mold providing for transfer of the material from the cartridge directly into said mold structure by said pressure means without contacting any part of the delivery end of said supply conduit member, said mounting means being operable to move said conduit member to an inoperative position backed away from said abutment face of the mold structure allowing said mold structure to be dismounted from the base structure and the spent cartridge casing to be expelled from the delivery end of said conduit member.

7. In an apparatus for injection molding of articles from heat plasticizable material, the combination which comprises, a base structure; a mold structure removably mounted on said base structure and having an entrance orifice for the introduction of said material into said mold structure and having an abutment face surrounding said orifice; a cylindrical supply conduit member for said plasticized material having a delivery end associated with said orifice of the mold structure; a supply cartridge adapted to be placed in said conduit member comprising a casing containing said material, having a rupturable end portion; mounting means on said base structure operable to move said conduit member from an inoperative position spaced from said orifice into an operative position wherein said delivery end of the conduit member engages said abutment face on the mold structure in sealing relationship therewith and said rupturable wall portion of the cartridge casing is placed directly in contact with said orifice so that upon rupture of said wall portion the interior of said cartridge casing communicates through said orifice directly with the interior of the mold structure providing for transfer of the material from the cartridge directly into said mold structure by pressure applied to said material without the material contacting any part of the surrounding supply conduit means, said mounting means being operable to move said conduit member to an inoperative position backed away from said abutment face of the mold structure allowing said mold structure to be dismounted from said base structure; and a plunger device mounted on said base structure providing a plunger member axially movable in said supply conduit member operable to exert pressure upon the material in said cartridge casing effective to rupture said end wall portion thereof so that the material is displaced from the casing through the rupture directly into said mold structure, and operable to expel the spent cartridge subsequent to the dismounting of said mold structure from the base structure.

References Cited in the file of this patent

UNITED STATES PATENTS

| Number | Name | Date |
|---|---|---|
| Re. 22,899 | Tucker | July 15, 1947 |
| 39,481 | Howells | Aug. 11, 1863 |
| 1,353,942 | Akin | Sept. 28, 1920 |
| 2,272,449 | Wacker | Feb. 10, 1942 |
| 2,287,277 | Ryder | June 23, 1942 |
| 2,327,079 | Wacker | Aug. 17, 1943 |
| 2,359,152 | Pryor et al. | Sept. 26, 1944 |
| 2,551,932 | Dimmer | May 8, 1951 |